(12) United States Patent
Purpura et al.

(10) Patent No.: US 6,754,230 B2
(45) Date of Patent: Jun. 22, 2004

(54) USER BANDWIDTH MONITOR AND CONTROL MANAGEMENT SYSTEM AND METHOD

(75) Inventors: William J. Purpura, Anaheim, CA (US); Kevin M. O'Brien, Los Alamitos, CA (US)

(73) Assignee: The Boeing Company, Chicago, IL (US)

( * ) Notice: Subject to any disclaimer, the term of this patent is extended or adjusted under 35 U.S.C. 154(b) by 337 days.

(21) Appl. No.: 09/943,839

(22) Filed: Aug. 31, 2001

(65) Prior Publication Data

US 2003/0043846 A1 Mar. 6, 2003

(51) Int. Cl.[7] .............................. H04J 3/16; H04J 3/22
(52) U.S. Cl. ..................................... 370/468; 370/477
(58) Field of Search ................................ 370/229, 230, 370/230.1, 231, 235, 252, 253, 395.21, 395.2, 395.41, 468, 477

(56) References Cited

U.S. PATENT DOCUMENTS

| | | | |
|---|---|---|---|
| 5,583,864 A | * 12/1996 | Lightfoot et al. | 370/396 |
| 5,884,037 A | * 3/1999 | Aras et al. | 395/200.56 |
| 5,949,758 A | 9/1999 | Kober | |
| 6,041,051 A | 3/2000 | Doshi et al. | |
| 6,081,835 A | * 6/2000 | Anticliff et al. | 709/217 |
| 6,097,722 A | * 8/2000 | Graham et al. | 370/395 |
| 6,434,141 B1 | 8/2002 | Oz et al. | |
| 6,452,924 B1 | 9/2002 | Golden et al. | |

FOREIGN PATENT DOCUMENTS

| | | | |
|---|---|---|---|
| EP | 0 912 015 | 4/1999 | |
| EP | 0 932 280 | 7/1999 | |
| EP | 0 932 280 A2 | * 7/1999 | H04I/12/56 |

OTHER PUBLICATIONS

Khasnabish et al., "Bandwidth Management/Policing in ATM Networks for Serving Multicategory Traffic Using a Simple Learning Algorithm and a Bucket Bank", Global Telecommunications Conference, Univ. of Windsor, pp. 1149–1153, (1993).

Winther et al., "Wireless Communication Network For Enabling Internet Access", U.S. 2002/0141382 A1, Oct. 3, 2002.

Barzegar et al., "Multifunction Interface Facility Connecting Wideband Multiple Access Subscriber Loops With Various Networks", U.S. 2001/0028644 A1, Oct. 11, 2002.

* cited by examiner

*Primary Examiner*—Wellington Chin
*Assistant Examiner*—Brenda Pham
(74) *Attorney, Agent, or Firm*—Harness, Dickey & Pierce P.L.C.

(57) ABSTRACT

A communication method for equitably distributing access to a shared broadband signal having a defined bandwidth to ensure that each user accessing the system receives at least a predetermined minimum bandwidth connection. The method uses a server system that includes at least one server and a plurality of client systems connected to at least one server. A respective user utilizes each client system. The method includes controlling user access to the shared broadband signal, monitoring an amount of the signal bandwidth used by each user, and controlling an amount of the signal bandwidth available to each user based on a total usage of the bandwidth.

21 Claims, 6 Drawing Sheets

USER BANDWIDTH MONITOR AND CONTROL MANAGEMENT SYSTEM AND METHOD

FIELD OF INVENTION

The invention relates generally to shared broadband signals, and more particularly to equitably distributing access, among a plurality of users, to a shared broadband signal having a defined bandwidth.

BACKGROUND OF THE INVENTION

The performance levels of a shared network system that utilizes a broadband wireless signal to communicate with a remote location, such as the Internet or a remote server system, can be seriously encumbered by users that monopolize access to the signal. The broadband signal has a specific bandwidth that must carry the input/output (I/O) data transmissions of all the users connected to the shared network, between the shared network location and the remote location. Thus, access to, or use of, the bandwidth must be properly managed such that each user connected to the network has adequate bandwidth access without any one user dominating use of the bandwidth.

Heavy users of a broadband signal on a typical shared network system have the largest impact on overall system performance. For example, users accessing such things as streaming audio or streaming video can lockup a large amount of signal bandwidth on an unrestricted pipeline, thereby reducing the amount of bandwidth available for access by other users connected to the network. The consumption of a large amount of bandwidth by one or more users can congest access to the signal, reduce transfer rates and inhibit overall performance of the network system. For example, communication features such as chat rooms, e-mail, virtual private networks (VPN), file transfer protocols (FTP), and other features offered by Internet Providers (IPs), consume a large amount of a broadband signal bandwidth.

Furthermore, heavy users can connect, or log on, to the network and remain logged on for an extended duration. Thus, a heavy user can, in effect, monopolize the bandwidth until they disconnect, or log off. This type of heavy use can cause the system to perform below an expected performance level, from both a user and provider point of view, and be a serious interference and inconvenience to other users.

One possible solution to bandwidth management is the use of an overall structured user access control, or 'throttle', as well as strict control of the utilization of specific high bandwidth consuming communication features.

Therefore, it would be desirable to manage the performance levels of a shared network system that utilizes a broadband wireless signal, such that each user connected to the network has adequate bandwidth access without any one user dominating use of the bandwidth.

BRIEF SUMMARY OF THE INVENTION

In one preferred form, the present invention forms a multi-communication method for equitably distributing access to a shared broadband signal having a defined bandwidth. The method uses a server system that includes at least one server and a plurality of client systems connected to the server. A respective user utilizes each client system. The method includes controlling user access to the shared broadband signal, monitoring an amount of signal bandwidth used by each user, and controlling an amount of signal bandwidth available to each user based on a total usage of the bandwidth.

In another embodiment, a system is provided for equitably distributing access to a shared broadband signal having a defined bandwidth. The system comprises at least one server and a plurality of client systems connected to the server. Each client system is utilized by a respective user. The system controls user access to the shared broadband signal, monitors the amount of signal bandwidth used by each user, and controls the amount of signal bandwidth available to each user based on a total usage of the bandwidth.

In yet another embodiment, a multi-communication method is provided for equitably distributing access to a shared broadband signal having a defined bandwidth. The method uses a server system including at least one server and a plurality of client systems connected to the server, wherein a respective user utilizes each client system. The method includes monitoring the amount of bandwidth each user is accessing, and identifying at least one excessive bandwidth user that is accessing an amount of bandwidth that exceeds a maximum use threshold. The method further includes determining a particular server system activity, which is causing the excessive bandwidth user to exceed the maximum use threshold. Additionally, the method includes controlling the particular server system activity of the excessive user such that an input/output (I/O) bandwidth differential is self-balancing.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
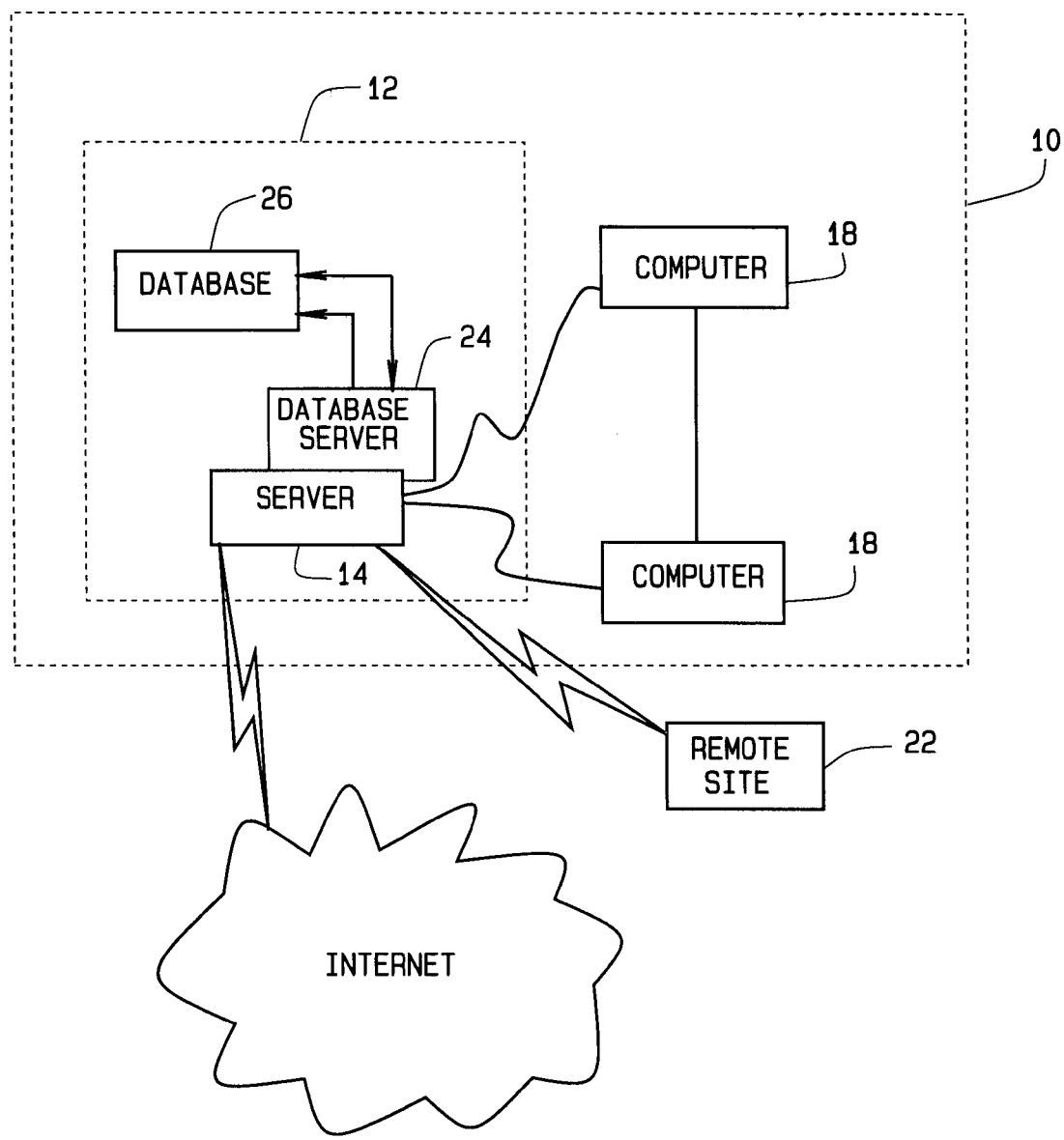
FIG. 1 is a simplified block diagram of a shared network system for equitably distributing access to a shared broadband signal, in accordance with an exemplary embodiment of the present invention.

FIG. 1 is a simplified block diagram of a network system 10 for equitably distributing access to a shared broadband signal having a defined bandwidth, in accordance with a preferred embodiment of the present invention. Network system 10 includes a server system 12, which includes a server 14. Additionally, network system 10 includes a plurality of client systems 18 connected to server 14. Network system 10 is a shared network such as a local area network (LAN). In an exemplary embodiment, server 14 includes a wireless modem (not shown), and client systems 18 include a web browser (not shown), such that client systems 18 can access the Internet, via server 14, using a broadband signal. Additionally, the modem and browser enable client systems 18 to access a remote site 22, such as a remote server system, using the broadband signal.

Server system 12 includes a data server 24 connected to a centralized database 26 containing product related information on a variety of products, as described below in further detail. In one embodiment, centralized database 26 is stored on server 14 and can be accessed by potential users at one of the client systems 18. In an alternate embodiment, centralized database 26 is stored remotely from server 14.

Network system 10 employs a management scheme, or algorithm, (not shown), preferably stored in database 26, to equitably distribute access to the shared broadband signal among a plurality of users utilizing client systems 18. Server 14 executes the management scheme. The users utilize client systems 18 to communicate with server 14. Initially users log on to server system 12 to establish a communication link with server 14 and enable access to network system 10 and the broadband signal. In operation, server system 12 utilizes the management scheme to identify heavy users that are using, or accessing, the signal at a level that is impacting access to the signal by others on server system 12. Once a heavy user is identified, server system 12 determines the type of activity, or operation, in which the heavy user is involved that is consuming an excessive amount of the bandwidth. For example, a heavy user may be participating in a chat room or downloading lengthy audio/video streams. Depending on the activity, server system 12 will manage, or "throttle", the heavy user's consumption of the bandwidth and access to the broadband signal. To manage, or throttle, bandwidth consumption, server system 12 monitors the bandwidth usage of the heavy user to see if the level of usage diminishes, and sends a warning to the heavy user to limit the particular operation, or terminates the user's access to the signal and issues a warning to the user to cease further attempts to access the signal for such operations, or terminates the user's access to server system 12.

As users are added, and overall bandwidth is consumed, each user will have their access to the bandwidth throttled until all users have access to a minimum amount of bandwidth. For example, user access will be throttled until all users are connected at a predetermined minimum data transfer rate, or speed, such as nominal 22 K bits per second (bps). Thus, as user access and bandwidth usage increase, each user will have their access throttled, or prorated. Each user's access is prorated such that each user is allowed access to as much bandwidth as is available without any user's access dropping below the predetermined minimum speed. For example, if a user is accessing a graphic intensive website, the user will be allowed as much of the bandwidth that is available without causing any other user's access to drop below nominal 22 K bps.

As another example of prorating user access, when a user receives, or sends, an e-mail with a large attachment, the management scheme will determine whether the size of attachment exceeds a predetermined size. If the attachment exceeds the predetermined size the attachment will be received, or sent, by the user utilizing as much of the bandwidth as is available without causing access to the bandwidth of any user to drop below nominal 22 K bps. As a further example of prorating user access, when a user receives, or sends, a file using a file transfer protocol (FTP), the management scheme determines whether the size of the file exceeds a predetermined size. If the file size exceeds the predetermined amount, the file will either be blocked and a notification that the file has been blocked will be sent to the user, or the file will be sent, or received, utilizing as much of the bandwidth as is available without causing access of any user to drop below nominal 22 K bps.

In one embodiment, if a user is sending or receiving streaming audio or video files, within network system 10 (shown in FIG. 1), the files will by transmitted without throttling. However, if an audio or video file is transmitted to a remote site outside of network system 10, using the broadband signal, the management scheme will either block transmission of the file, or throttle the file transmission such that no user's access drops below the predetermined minimum speed. Additionally, if a user is using the broadband signal to access a virtual private network (VPN), the user will be allowed to access up to a predetermined maximum amount of the bandwidth without causing any other user's access to drop below the predetermined minimum speed.

Figure 2:
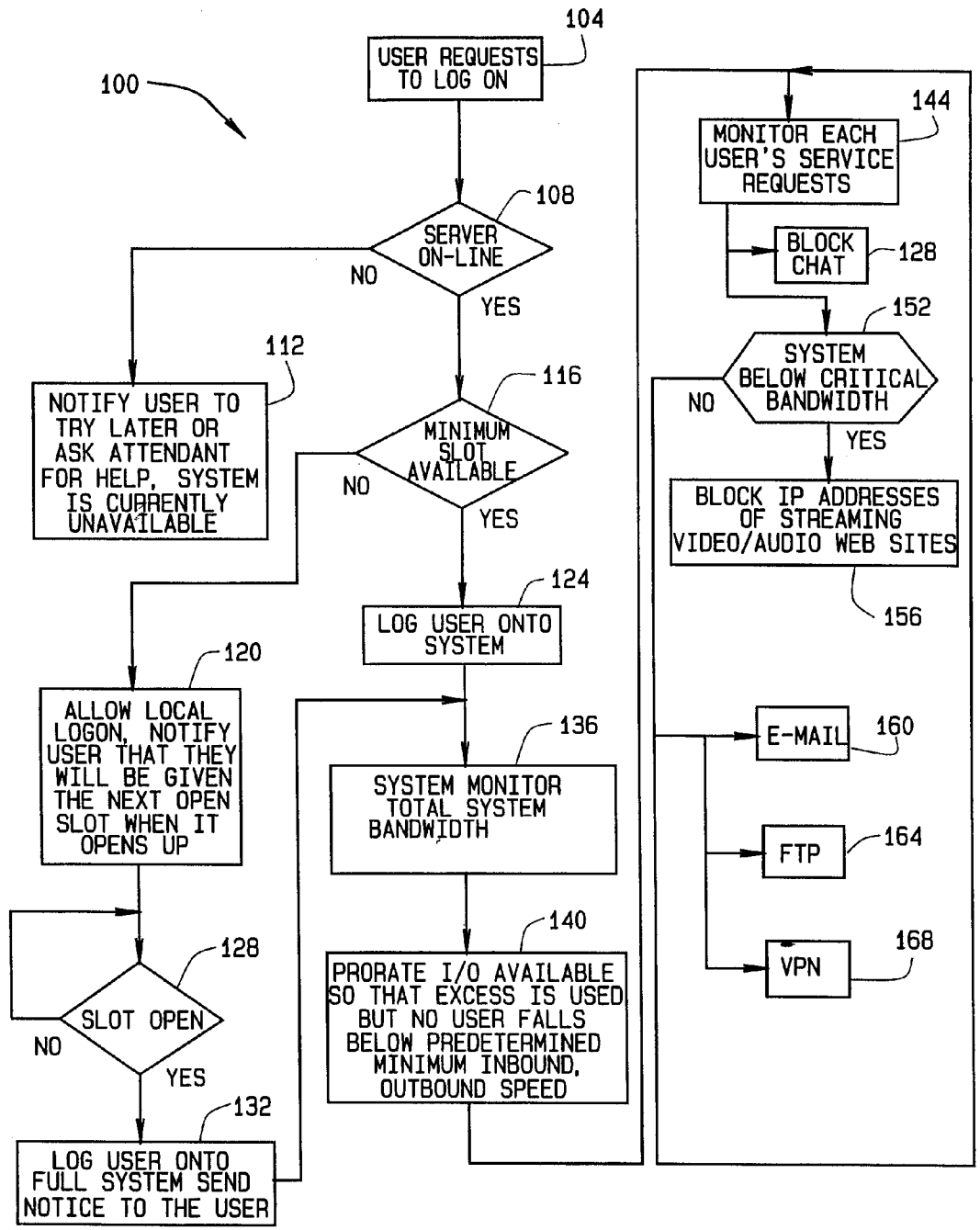
FIG. 2 is a flow diagram of a top-level routine of a management scheme employed by the shared network system, shown in FIG. 1, in accordance with one embodiment of the present invention.

FIG. 2 is a flow diagram 100 of a top-level routine of the management scheme employed by server system 12, in accordance with an exemplary embodiment of the invention. Utilizing client system 18 (shown in FIG. 1), a user wishing to access the broadband signal sends a request to server 14 (shown in FIG. 1) requesting to log on to server system 12 (shown in FIG. 1), which is part of an integrated Internet access service, as indicated at step 104. Upon receiving the request to log on, the management scheme determines, at step 108, whether server 14 is "on-line". As used herein, "on-line" means that server 14 is functioning properly and has established all necessary communication links, such as links with database 26 (shown in FIG. 1), the Internet, or remote site 22 (shown in FIG. 1). If server 14 is determined not to be on-line, a message is sent to the user, at step 112, notifying the user that server system 12 is currently unavailable, and to request logging on at a later time. In one embodiment, an attendant is available to assist users having difficulty utilizing server system 12, in which case, the message sent to the user, if server 14 is not logged on, will include an instruction to request assistance from the attendant. If server 14 is on line, server 14 determines, at step 116, whether there is an amount of bandwidth available such that the user can access the signal at a speed equal to, or greater than, the predetermined minimum speed.

If the user can not access the signal at the minimum speed, the user is allowed to log on to server system 12 for local use only, as indicated at step 120, and is notified that the user will be given access to the signal as soon as there is sufficient bandwidth to allow access at the minimum speed. When a user is logged on to server system for local use only, the user is able to communicate with server system 12 and other users within network system 10, but is not given access to an outside line to communicate outside of network system 10. If there is sufficient bandwidth to allow the user to access the signal at the minimum speed, the user is allowed to fully log on, as indicated at step 124, to server system 12 such that the user is given local access within network system 10 and access to the broadband signal.

When a user is logged on for local use only, server system 12 monitors the signal, as indicated at step 128, until there is sufficient bandwidth available to provide the predetermined minimum data transfer rate, then allows the user to fully log on, as indicated at step 132. Once a user is fully logged on, server 14 monitors the total amount of bandwidth being used by users sending and receiving transmissions via the broadband signal, as indicated at step 136.

While the total amount of bandwidth being used is monitored each user's use, or access, of the bandwidth is prorated. User access is prorated, as indicated at step 140, such that each user is allowed access to as much of the excess bandwidth as is needed for the input and output (I/O) operations of each individual user without causing any other user's transmission rate to fall below the predetermined minimum speed.

While monitoring and prorating, as indicated at steps 136 and 140, the management scheme monitors each user's service, or operation, requests transmitted to server 14, as indicated at step 144. For example, a user utilizes client system 18 to transmit a service request to server 14 when the user wants to send or receive e-mail, enter a chat room on the Internet, send or receive a file using a FTP, or access a VPN. When server 14 receives a service request, the management scheme immediately blocks, at step 148, all requests to access chat rooms. If the service request is not a request to enter a chat room, the management scheme determines, at step 152, if the amount of bandwidth available is below a predetermined critical level. For example, the management scheme determines if the amount of bandwidth available to all users without outside access falls below nominal 22 K bps.

When user transmits a service request to server 14 and the amount of available bandwidth is below the critical level access to all streaming audio or video web sites is blocked, as indicated at step 156. If the available bandwidth is above the critical level, user requests, such as e-mail, FTP, or VPN transmissions, are allowed. Upon the allowance of an e-mail request, the management scheme implements an e-mail bandwidth control sub-routine, as indicated at step 160. Similarly, upon the allowance of a FTP request, the management scheme implements a FTP bandwidth control sub-routine, as indicated at step 164. Likewise upon the allowance of a VPN request, the management scheme implements 168 a VPN bandwidth control sub-routine.

Figure 3:
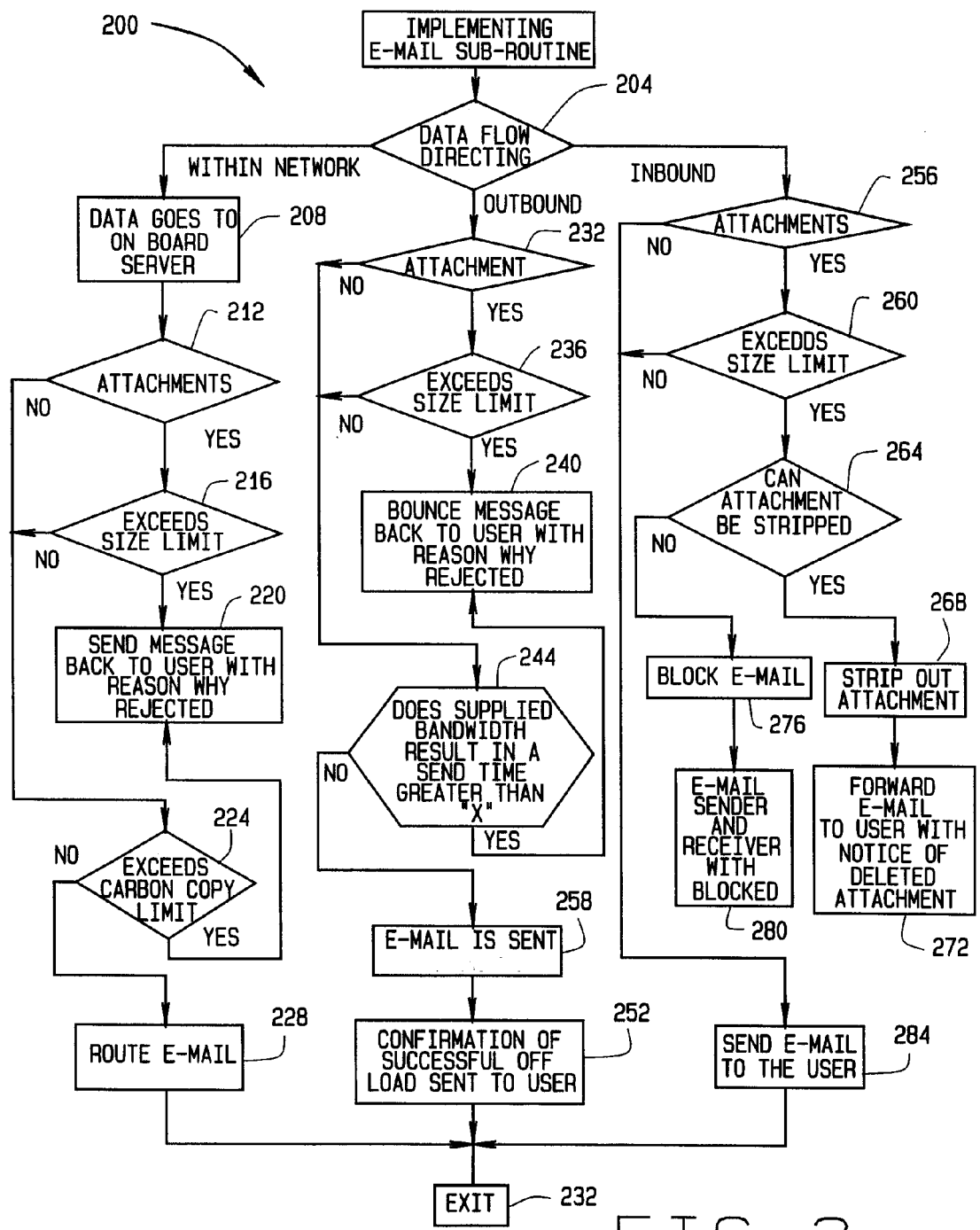
FIG. 3 is a flow diagram of an e-mail bandwidth control sub-routine of the management scheme shown in FIG. 2.

FIG. 3 is a flow diagram 200 of the management scheme e-mail bandwidth control sub-routine. The e-mail bandwidth control subroutine determines, at step 204, the type of data flow involved in the e-mail request. An e-mail request can be a request to route an e-mail message within network system 10, such that data flows only within network system 10. Additionally, an e-mail request can be a request to transmit an outbound e-mail message from a user within network system 10 to a remote user outside of network system 10, such that data flows from server system 12 to a remote location. Furthermore, an e-mail request can be a request by a user within network system 10 to receive an inbound e-mail from a remote user, such that data flows from a remote location to server system 12.

When a request is made to route an e-mail message within network system 10, data flows from a client system 18 to server 14, as indicated at step 208, and then to another client system 18. Once server 14 receives the request to locally route an e-mail message, it is determined, at step 212, whether the e-mail message includes an attachment. If it is determined that the e-mail includes an attachment, the e-mail sub-routine determines whether the attachment exceeds a predetermined size limit as indicated at step 216. If the attachment exceeds the predetermined size limit, server 14 terminates routing the e-mail to an intended recipient and sends a notification message to the user that initiated the e-mail, informing the user that the e-mail will not be routed to the recipient because the attachment exceeds the predetermined size limit, as indicated at step 220. If the e-mail message does not have an attachment, or the attachment does not exceed the predetermined size limit, the e-mail bandwidth control sub-routine determines, at step 224, whether the e-mail message exceeds a predetermined carbon copy limit. The carbon copy limit prevents mass distribution of e-mail messages, or 'Spam' e-mail, from consuming large amounts of bandwidth by limiting the number of e-mail copies that can be sent. When an e-mail message exceeds the carbon copy limit, server 14 terminates routing the e-mail to the intended recipients and sends a notification message to the user that initiated the e-mail, informing the user that the message will not be routed because the e-mail message exceeds the predetermined carbon copy limit, as indicated at step 220. When the e-mail message is within the carbon copy limit, server 14 routes the message to the intended recipient, as indicated at step 228, and the e-mail sub-routine is exited 232, as indicated at step.

When an outbound request is made to route an e-mail message from a user within network system 10 to a remote user outside of network system 10, data flows from a client system 18 to server 14, where server 14 determines, at step 232, if the e-mail message contains an attachment. If it is determined that the e-mail includes an attachment, the e-mail sub-routine determines, at step 236, whether the attachment exceeds a predetermined size limit. If the attachment exceeds the predetermined size limit, server 14 terminates routing the e-mail to an intended recipient and sends a notification message to the user that initiated the e-mail, informing the user that the e-mail will not be routed to the recipient because the attachment exceeds the predetermined size limit, as indicated at step 240. If the e-mail message does not have an attachment, or the attachment does not exceed the predetermined size limit, the e-mail bandwidth control sub-routine determines, at step 244, whether utilizing the amount of bandwidth available, the send time of the e-mail will exceed a predetermined duration. If the send time will exceed the predetermined duration, a notification message is sent to the user that initiated the e-mail, informing the user that the e-mail will not be routed to the recipient because the send time will exceed the predetermined duration, as indicated at step 240. If the send time will not exceed the predetermined duration, the e-mail is routed to the recipient, as indicated at step 248, a message confirming the e-mail has been routed is sent to the initiator, as indicated at step 252, and the sub-routine is exited, as indicated at step 232.

When an inbound request is made by a user within network system 10 to receive an e-mail from a remote user, data flows from server 14 to a client system 18. Upon receiving the request to route the e-mail message, server 14 executes the e-mail sub-routine, thereby determining, at step 256, whether the e-mail message contains an attachment. If it is determined that the e-mail includes an attachment, the e-mail sub-routine determines, at step 260, whether the attachment exceeds a predetermined size limit. If the attachment exceeds the predetermined size limit, server 14 determines, at step 264, whether the attachment can be stripped from the e-mail message. If the attachment can be stripped, the attachment is striped, as indicated at step 268, and the e-mail is routed to the recipient along with a notification that the attachment has been deleted, as indicated at step 272. If the attachment can not be stripped, routing of the e-mail is terminated, as indicated at step 276, and a message sent to both the initiator of the e-mail and the intended recipient, informing the initiator and recipient that routing of the e-mail has been terminated, as indicated at step 280. If the e-mail does not include an attachment, the e-mail is routed, at step 284, to the recipient and the e-mail sub-routine is exited, as indicated at step 232.

Figure 4:
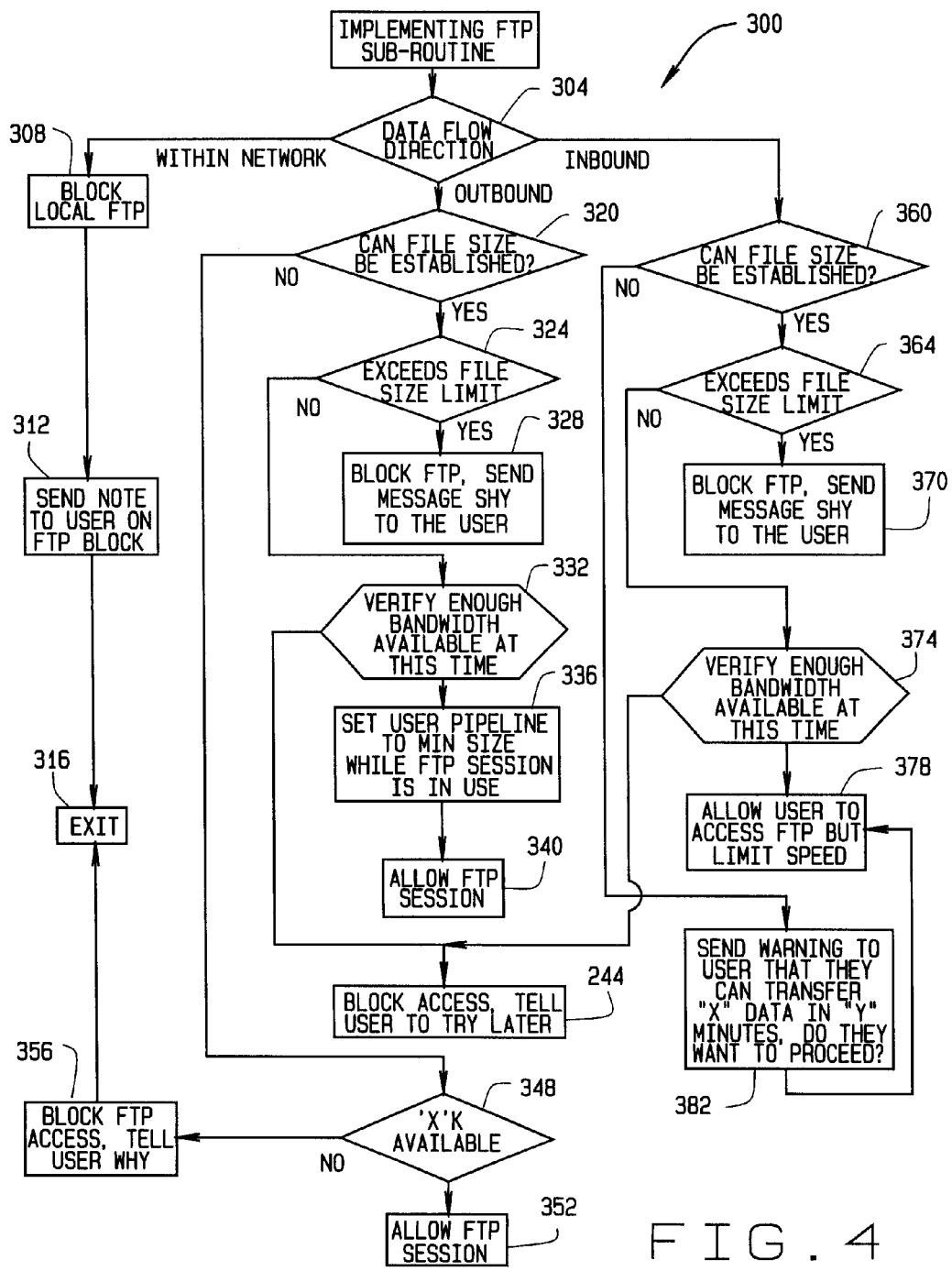
FIG. 4 is a flow diagram of a file transfer protocol bandwidth control sub-routine of the management scheme shown in FIG. 2.

FIG. 4 is a flow diagram 300 of the management scheme FTP bandwidth control sub-routine. The FTP bandwidth control subroutine determines, at step 304, the type of data flow involved in the FTP request. A request to initiate an FTP session can be a request to initiate the session within network system 10 such that data flows only within network system 10. Additionally, a FTP request can be an outbound request from a user within network system 10 to initiate a session with user outside of network system 10, such that data flows from server system 12 to a remote location. Furthermore, a FTP request can be an inbound request by a remote user to initiate a session with user within network system 10, such that data flows from a remote location to server system 12.

When a request is made to initiate an FTP session within network system 10, data flows from a client system 18 to server 14. The control scheme does not allow local FTP sessions. Therefore, if server 14 receives a request to initiate a FTP session within network system 10, the session is blocked, as indicated at step 308, the user is notified that the session has been blocked, as indicated at step 312, and the FTP sub-routine is exited, as indicated at step 316.

When an outbound request is made by a user within network system 10 to initiate a session with a remote user, the FTP sub-routine determines, at step 320, whether the size of the file can be established. If the file size can be established, it is determined, at step 324, whether the file size exceeds a predetermined size limit. If the file size exceeds the predetermined limit, server 14 blocks the session and sends a notification to the user requesting the FTP session, informing the user that the session has been blocked due to excessive file size, as indicated at step 328. If the file size does not exceed the predetermined size limit the FTP sub-routine verifies whether there is enough available bandwidth to establish the FTP session, as indicated at step 332. When there is sufficient bandwidth available, the amount of bandwidth the user is allowed to access, or user pipeline, is fixed at a predetermined size, as indicated at step 336, and the FTP session is allowed, as indicated at step 340. When there is insufficient bandwidth available for the FTP session, the session is blocked, at step 344, and the user is instructed to try initiating the session at a later time. If the file size can not be established, the sub-routine determines, at step 348, whether there is a predetermined minimum amount of bandwidth available. If it is determined that there is a minimum amount of available bandwidth, the session is allowed, at step 352, otherwise the session is blocked and the user is notified that the session has been blocked, as indicated at step 356.

When an inbound request is made by a remote user outside of network system 10 to initiate a FTP session, data flows from server 14 to a client system 18. Upon receiving the request to initiate the session, server 14 executes the FTP sub-routine, thereby determining whether the size of the file can be established, as indicated at step 360. If the file size can be established, it is determined, at step 364, whether the file size exceeds a predetermined size limit. If the file size exceeds the predetermined limit, server 14 blocks the session and sends a notification stating that the session has been blocked due to excessive file size, to the user requesting the FTP session, as indicated at step 370. If the file size does not exceed the predetermined size limit the FTP sub-routine verifies whether there is enough available bandwidth to establish the FTP session, as indicated at step 374. When there is sufficient bandwidth available, the session is allowed with a data transfer rate limited to a predetermined maximum speed, as indicated at step 378. When there is insufficient bandwidth available for the FTP session, the session is blocked and the user is instructed to try initiating the session at a later time, as indicated at step 344. If the file size can not be established, a message is sent to the user requesting the FTP session, informing the user that a specific amount of data can be transferred in a specific amount of time, and inquiring whether the user wants to proceed, as indicated at step 382. If the user chooses to proceed, the session is allowed with a data transfer rate limited to a predetermined maximum speed, as indicated at step 378.

Figure 5:
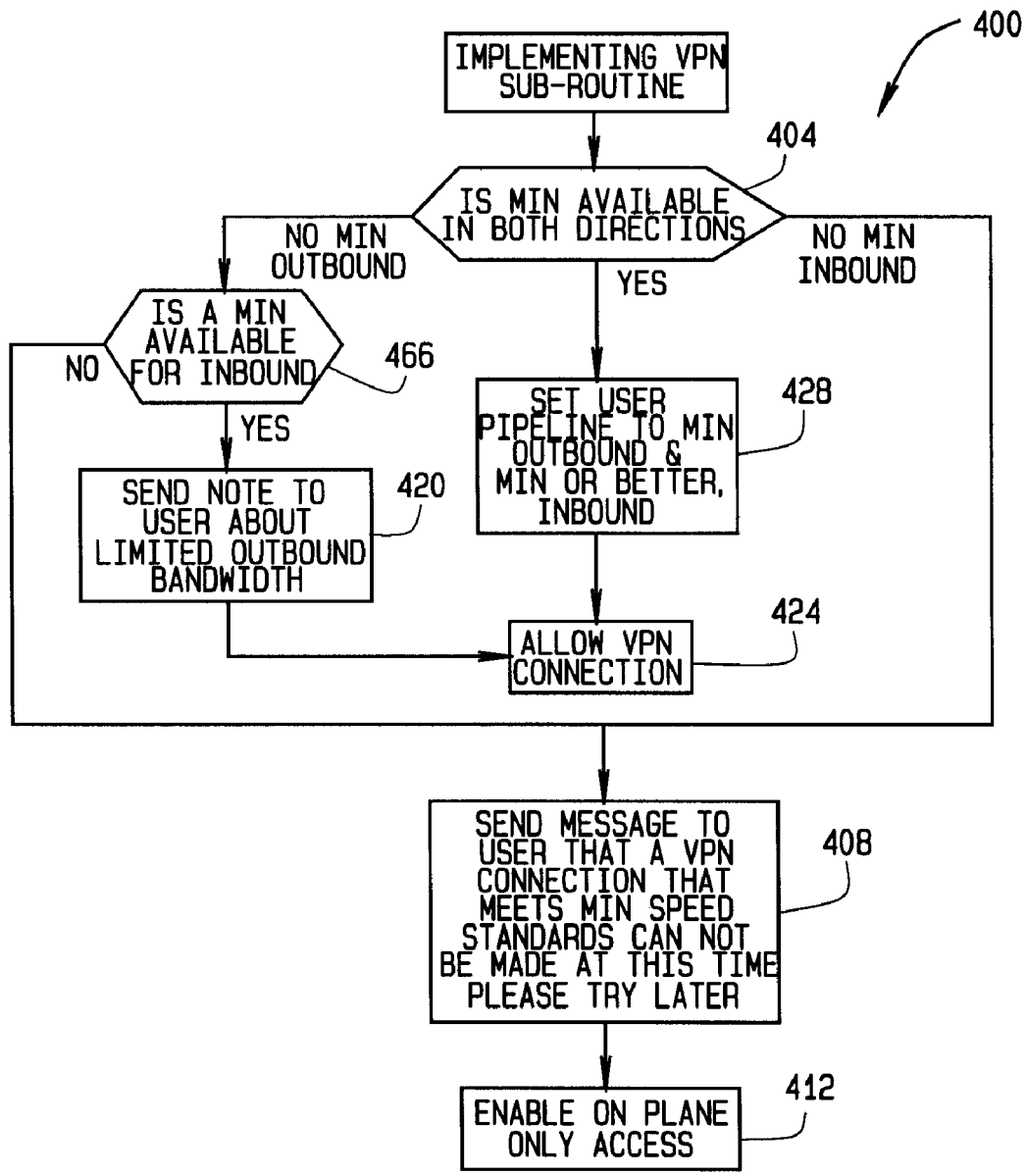
FIG. 5 is flow diagram of a virtual private network bandwidth control sub-routine of the management scheme shown in FIG. 2.

FIG. 5 is a flow diagram 400 of the management scheme VPN bandwidth control sub-routine. When a user with network system 10 requests access to VPN, the VPN bandwidth control sub-routine determines whether a predetermined minimal amount of bandwidth is available in both data transmission directions, for example data transmitted from server 14, or outbound data, and data received by server 14, or inbound data. If there is not the minimal amount of bandwidth available for inbound data, a message is sent notifying the user that a VPN connection meeting a minimum speed can not be made and requesting that the user try again at a later time, as indicated at step 408. After the user is notified that the connection can not be made, the user is allowed access to network system 10 for local use within network system 10 only, as indicated at step 412. When the minimal amount of bandwidth is not available for outbound data, the sub-routine determines, at step 416, whether there is at least the minimal amount of bandwidth available for inbound data. If the there is the minimal amount of bandwidth available for inbound data, a notification is sent to the user that the minimum amount of outbound bandwidth is not available, as indicated at step 420, and the user is allowed the VPN connection, as indicated at step 424. If there is not the minimal amount of inbound bandwidth available, a message is sent notifying the user that a VPN connection meeting a minimum speed can not be made and requesting that the user try again at a later time, as indicated at step 408. When there is both the minimal amount of inbound and outbound bandwidth available, the user is allowed the VPN connection, as indicated at step 424, and the amount of bandwidth the user is allowed to access, or user pipeline, is fixed such that the outbound bandwidth is set to the minimum amount, and the inbound bandwidth is set to the minimum amount or better, as indicated at step 428.

Figure 6:
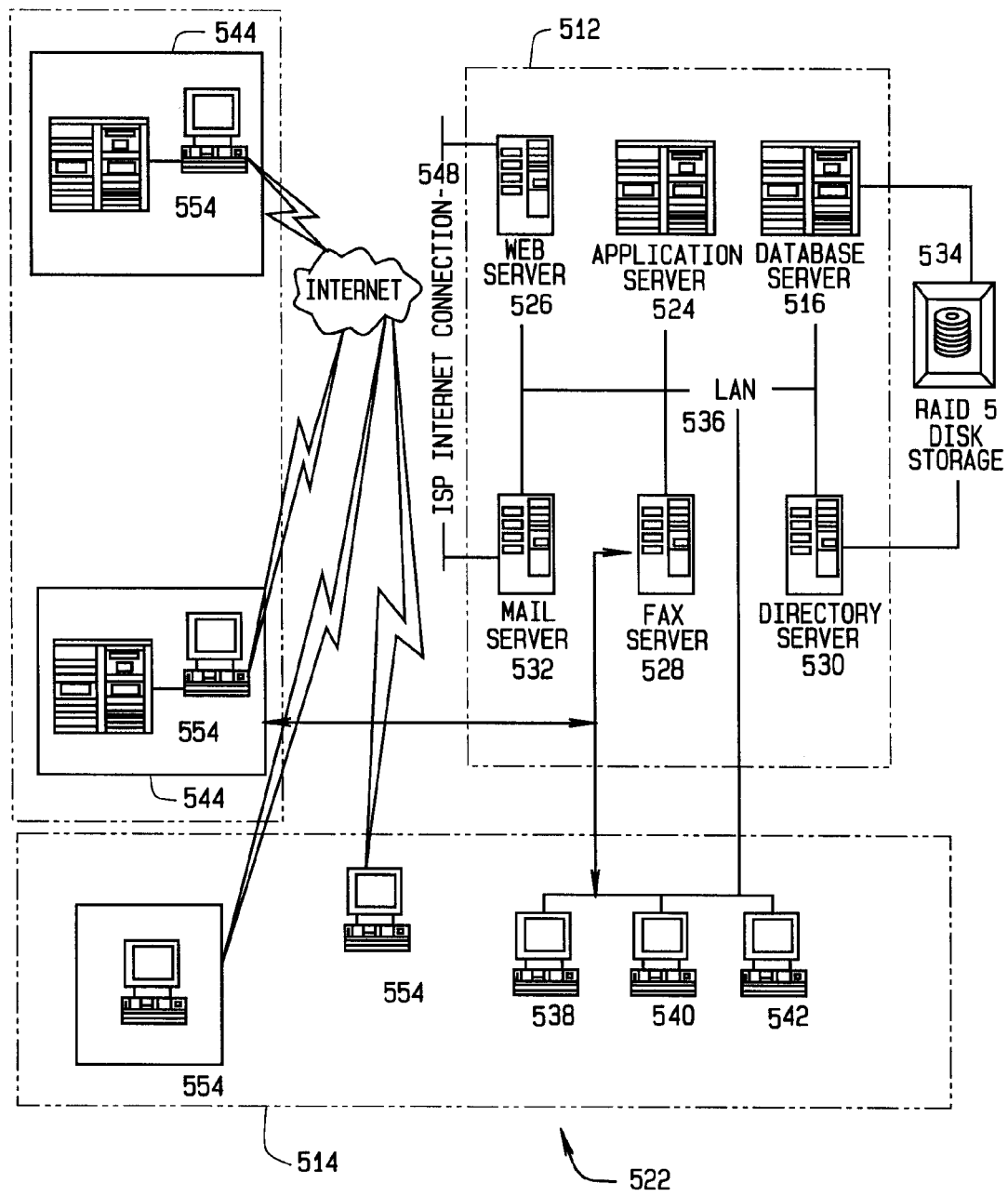
FIG. 6 is an expanded version block diagram of a network system for equitably distributing access to a shared broadband signal having a defined bandwidth, in accordance with an alternate embodiment of the invention.

FIG. 6 is an expanded version block diagram of a network system 522 for equitably distributing access to a shared broadband signal having a defined bandwidth, in accordance with an alternate embodiment of the invention. Network system 522 includes server system 512 and client systems 514. Server system 512 includes database server 516, an application server 524, a web server 526, a fax server 528, a directory server 530, and a mail server 532. A disk storage unit 534 is coupled to database server 516 and directory server 530. Servers 516, 524, 526, 528, 530 and 532 are coupled in a local area network (LAN) 536. In addition, a system administrator's workstation 538, a user workstation 540, and a supervisor's workstation 542 are coupled to LAN 536. Alternatively, workstations 538, 540, and 542 are coupled to LAN 536 via an Intranet.

Each workstation, 538, 540, and 542 is a personal computer having a web browser. Although the functions performed at the workstations typically are illustrated as being performed at respective workstations 538, 540, and 542, such functions can be performed at one of many personal computers coupled to LAN 536. Workstations 538, 540, and 542 are illustrated as being associated with separate functions only to facilitate an understanding of the different types of functions that can be performed by individuals having access to LAN 536.

Server system 512 is configured to be communicatively coupled to various remote systems 544 via an ISP Internet connection 548. The communication is illustrated as being performed via the Internet, however, any other wide area network (WAN) type communication can be utilized in other embodiments, i.e., the systems and processes are not limited to being practiced via the Internet. In addition, and rather than a WAN 550, local area network 536 could be used in place of WAN 550.

While the invention has been described in terms of various specific embodiments, those skilled in the art will recognize that the invention can be practiced with modification within the spirit and scope of the claims.

What is claimed is:

1. A communication method for equitably distributing access to a shared broadband signal having a defined bandwidth, using a server system including at least one server and a plurality of client systems connected to at least one server, wherein each client system is utilized by a respective user, said method comprising:

receiving a user request to access the shared broadband signal;

determining if the server is on-line;

determining whether a minimum threshold of the bandwidth is available for use, if the server is determined to be on-line;

allowing the user access to the signal, if there is determined to be a minimum threshold of bandwidth available for use;

allowing the user access to the server for local use, and notifying the user access to the signal will be allowed when the amount of bandwidth available exceeds the minimum threshold, if there is determined not to be a minimum threshold of bandwidth available for use;

monitoring an amount of the bandwidth used by each user; and controlling an amount of the bandwidth available to each user based on a total usage of the bandwidth, such that each user is ensured a predetermined minimum bandwidth.

2. The method of claim 1, wherein the method further comprises:

notifying the user to request access to the signal at a later time, if the server is determined to be off-line.

3. The method of claim 1, wherein the method further comprises:

monitoring the total input/output (I/O) use of the bandwidth; and prorating the amount of the bandwidth each user is allowed to access, such that excess bandwidth is utilized and the prorated amount of the bandwidth remains above a minimum threshold.

4. The method of claim 1, wherein monitoring an amount of the bandwidth used by each user comprises:

monitoring service requests by each user, wherein the service requests include chat room requests, e-mail requests, file transfer protocol requests, and virtual private network requests; and blocking all chat room service requests.

5. The method of claim 1, wherein controlling an amount of bandwidth available to each user comprises determining if an amount of the bandwidth available is below a critical level, upon the server receiving a service request.

6. The method of claim 5, wherein controlling an amount of bandwidth available to each user further comprises blocking all service requests to access websites that transmit at least one of streaming audio and streaming video, if the determined amount of the bandwidth available is below the critical level.

7. The method of claim 5, wherein controlling an amount of bandwidth available to each user further comprises:

allowing an e-mail service request, if the determined amount of the bandwidth available is above the critical level; and implementing an e-mail bandwidth control routine upon allowing an e-mail service request.

8. The method of claim 5, wherein controlling an amount of bandwidth available to each user further comprises:

allowing a file transfer protocol (FTP) service request, if the determined amount of the bandwidth available is above the critical level; and implementing a FTP bandwidth control routine upon allowing the FTP service request.

9. The method of claim 5, wherein controlling an amount of bandwidth available to each user further comprises:

allowing a virtual private network (VPN) service request, if the determined amount of the bandwidth available is above the critical level; and implementing a VPN bandwidth control routine upon allowing the VPN service request.

10. A system for equitably distributing access to a shared broadband signal having a defined bandwidth, said system comprising:

a plurality of client systems, wherein each said client system is configured to be utilized by a respective user; and at least one server interconnecting said client systems, said server being configured to execute a management scheme that includes:

receiving a user request to access the signal;

determining if said server is on-line;

determining whether a minimum threshold of the bandwidth is available for use, if said server is determined to be on-line;

allowing the user access to the signal, if there is determined to be a minimum threshold of bandwidth available for use;

allowing the user access to said server for local use, and notifying the user access to the signal will be allowed when the amount of the bandwidth available exceeds the minimum threshold, if there is determined not to be a minimum threshold of bandwidth available for use;

monitoring an amount of said bandwidth used by each user; and controlling an amount of said bandwidth available to each user based on a total usage of the bandwidth.

11. The system of claim 10, wherein said management scheme further includes notifying the user to request access to the signal at a later time, if said server is determined to be off-line.

12. The system of claim 10, wherein said management scheme further includes monitoring the total input/output (I/O) use of the bandwidth, and prorating the amount of the bandwidth each user is allowed to access, such that excess bandwidth is utilized and the prorated amount of the bandwidth remains above a minimum threshold.

13. The system of claim 10, wherein to monitor an amount of the bandwidth used by each user, said management scheme further includes monitoring service requests by each user, wherein the service requests include chat room requests, e-mail requests, file transfer protocol requests, and virtual private network requests, and blocking all chat room service requests.

14. The system of claim 10, wherein to control an amount of bandwidth available to each user, said management scheme further includes determining if an amount of the bandwidth available is below a critical level, upon said server receiving a service request.

15. The system of claim 14, wherein to control an amount of bandwidth available to each user, said management scheme further includes blocking all service requests to access websites that transmit at least one of streaming audio and streaming video, if the determined amount of the bandwidth available is below the critical level.

16. The system of claim 14, wherein to control an amount of bandwidth available to each user, said management scheme further includes allowing an e-mail service request, if the determined amount of the bandwidth available is above the critical level, and implementing an e-mail bandwidth control routine upon allowing the e-mail service request.

17. The system of claim 14, wherein to control an amount of bandwidth available to each user, said management scheme further includes allowing a file transfer protocol (FTP) service request, if the determined amount of the bandwidth available is above the critical level, and implementing a FTP bandwidth control routine u allowing the FTP service request.

18. The system of claim 14, wherein to control an amount of bandwidth available to each user, said management scheme further includes allowing a virtual private network (VPN) service request, if the determined amount of the bandwidth available is above the critical level and implementing a VPN bandwidth control routine upon allowing the VPN service request.

19. A communication method for equitably distributing access to a shared broadband signal having a defined bandwidth, using a server system including at least one server and a plurality of client systems connected to at least one server, wherein each client system is utilized by a respective user, said method comprising:

monitoring the amount of the bandwidth each user is accessing;

identifying at least one excessive bandwidth user that is accessing an amount of the bandwidth that exceeds a maximum use threshold;

determining a particular server system activity that is causing the excessive bandwidth user to exceed the maximum use threshold;

prohibiting the particular server system activity; and sending a notice to the excessive user informing the excessive user to cease requesting the particular server system activity.

20. The method of claim 19, wherein the method further comprises sending a notice to the excessive user informing the excessive user to reduce use of the particular server system activity.

21. The method of claim 19, wherein controlling the particular server system activity of the excessive user comprises terminating access to the signal by the excessive user.

* * * * *

UNITED STATES PATENT AND TRADEMARK OFFICE
CERTIFICATE OF CORRECTION

PATENT NO. : 6,754,230 B2
DATED : June 22, 2004
INVENTOR(S) : Purpura et al.

It is certified that error appears in the above-identified patent and that said Letters Patent is hereby corrected as shown below:

Column 4,
Line 9, "by" should be -- be --.

Column 6,
Line 14, after "excited" insert -- at --; and after "232" delete "as indicated at step.".

Column 8,
Line 27, after "If" delete "the".

Column 11,
Line 27, after "routine" delete "u".

Signed and Sealed this

Eleventh Day of April, 2006

JON W. DUDAS
*Director of the United States Patent and Trademark Office*